United States Patent [19]

Becquerel et al.

[11] Patent Number: 5,135,046
[45] Date of Patent: Aug. 4, 1992

[54] HEATING AND/OR AIR CONDITIONING APPARATUS FOR A MOTOR VEHICLE, HAVING TWO AIR FANS

[75] Inventors: Michel Becquerel, Le Mesnil-Saint-Denis; Didier Loup, Maurepas, both of France

[73] Assignee: Valeo Thermique Habitacle, Le Mesnil-Saint-Denis, France

[21] Appl. No.: 694,882

[22] Filed: May 2, 1991

[30] Foreign Application Priority Data

May 4, 1990 [FR] France ................. 90 05680

[51] Int. Cl.[5] .................. F25B 29/00; B60H 1/00
[52] U.S. Cl. ......................... 165/43; 165/42; 165/122; 165/124; 237/12.3 B; 415/211.2
[58] Field of Search ............... 165/122, 124, 127, 42, 165/43, 41; 237/12.3 B; 415/211.2

[56] References Cited

U.S. PATENT DOCUMENTS

| 1,879,802 | 9/1932 | Harnett | 165/127 |
|---|---|---|---|
| 1,889,895 | 12/1932 | Henshall | 165/127 |
| 1,938,801 | 12/1933 | Bourne et al. | 165/122 |
| 2,008,255 | 7/1935 | Larkin | 165/122 |
| 2,149,382 | 3/1939 | Anderson . | |
| 2,184,837 | 12/1939 | Hemming | 165/122 |
| 2,496,652 | 2/1950 | Ahrens . | |
| 2,904,316 | 9/1959 | Hagen . | |
| 2,995,906 | 8/1961 | Brandimarte | 165/124 |
| 3,313,342 | 4/1967 | Laing | 165/124 |
| 3,403,725 | 10/1968 | Miner | 165/122 |
| 3,519,069 | 7/1970 | Green | 165/122 |
| 3,603,380 | 9/1971 | Corhanidis | 165/42 |
| 4,712,611 | 12/1987 | Witzel | 165/122 |

FOREIGN PATENT DOCUMENTS

| 2623757 | 6/1989 | France . | |
|---|---|---|---|
| 0130815 | 8/1982 | Japan | 165/122 |
| 0697261 | 9/1953 | United Kingdom | 165/122 |
| 0740069 | 7/1955 | United Kingdom | 165/122 |

Primary Examiner—John K. Ford
Attorney, Agent, or Firm—Dennison, Meserole, Pollack & Scheiner

[57] ABSTRACT

The invention relates to heating and/or air conditioning apparatus for the cabin of a motor vehicle, of a kind in which two separate fans deliver air into a common housing through which the air is passed to a heat exchanger. The object of the invention is to obtain even distribution of the air delivered through the heat exchanger, despite any differences in the flow rates of air delivered by one fan as compared with the other. The apparatus includes a housing having two inlet sections which are arranged facing each other and which are connected to the two respective fans for introducing the two air streams into the housing in parallel and opposed inlet directions. These directions are parallel to a base wall of the housing, and this base wall is provided with a separating bulkhead which projects from it into the interior of the housing. The bulkhead extends in a direction close to the inlet direction, which is substantially diagonal so as to define two chambers within the housing and extending over substantially the same width in the inlet direction. The two chambers exhaust into an outlet section which leads to the heat exchanger.

9 Claims, 3 Drawing Sheets

HEATING AND/OR AIR CONDITIONING APPARATUS FOR A MOTOR VEHICLE, HAVING TWO AIR FANS

FIELD OF THE INVENTION

This invention relates to apparatus for the heating and/or conditioning of the air supply for a motor vehicle, the said apparatus being of the kind of comprising two fans (commonly referred to as motorised fan units) for delivering two streams of fresh air to a common heat exchanger of the apparatus, via the interior of a distribution housing of the apparatus.

The heat exchanger may be a simple heating radiator if the apparatus is simply for heating the air supply to the vehicle, or it may be an evaporator and an associated heating radiator downstream of the evaporator in the case where the apparatus is for air conditioning purposes. In the latter case, the fresh air from outside first passes through the evaporator in which it may be cooled, and may then be arranged to pass through the heating radiator so as to be heated.

BACKGROUND OF THE INVENTION

Apparatus of the above kind is commonly used in some kinds of motor vehicles in which the cabin is quite large and therefore necessitates a flow rate of heating and/or air conditioning air which is larger than in the case of the majority of conventional vehicles. It has in fact become clear that it is preferable to use two fans with additive air flows, rather than a single fan giving the required increased air flow rate. If only a single fan is provided, in order to obtain such a high flow rate it would be necessary to design a special fan which could not be used on the more usual sizes of vehicles, and which would be somewhat cumbersome and also noisy.

By contrast, by using two fans it is possible to use fans of standard design, that is to say those which can be used on a wide variety of vehicles, and which in addition are of small physical size.

However, the use of two fans in a single installation has a disadvantage which arises from the fact that, due to variations in fan characteristics resulting from manufacturing tolerances, the flow rates of air delivered by the two fans tend to be somewhat different from each other. These fans are driven by direct current electric motors, and for equal voltages, two fans may in fact deliver air at very substantially different flow rates. As a result, it is impossible to arrange two fans in such a way that they will produce exactly the same flow rate, so that therefore the air passing through the heat exchanger has a rate of flow that is not the same over the whole of the surface of the heat exchanger.

In practice, the two air streams delivered respectively by the two fans are channeled by means of vanes which are perpendicular to the inlet direction of the air streams, and which are arranged to direct the two streams respectively towards two halves of the heat exchanger, commonly a right hand half and a left hand half. Thus the flow rate of the air passing through one of these halves of the heat exchanger is not the same as that of the air passing through the other.

This drawback may be further aggravated by the fact that the two fans are generally connected to the housing through two respective ducts which are not necessarily of the same configuration, and which therefore may produce different energy losses due to friction and turbulence.

DISCUSSION OF THE INVENTION

A principal object of the invention is to overcome the above drawbacks.

According to the invention, in a heating and/or air conditioning apparatus for a motor vehicle, comprising two air fans, adapted to deliver respectively two streams of fresh air to a common heat exchanger within a housing, the housing defines two inlet sections, which are disposed facing each other and which are adapted to be connected respectively to the two fans, whereby to introduce the two air streams into the housing in inlet directions which are parallel and opposed to each other, and parallel to a base wall of the housing, the base wall being provided with a separating bulkhead which projects into the housing, and which extends in a general direction close to the inlet direction of the two air streams along the base wall, so as to define two chambers which extend substantially over the same width in the said inlet direction and which exhaust into an outlet section which is adapted to be connected to the heat exchanger.

Thus, in the apparatus according to the invention, the two air streams can be directed into two adjacent chambers in the interior of the housing which extend substantially over the same width in the inlet direction.

By disposing the two inlet sections respectively on the right and left hand sides of the housing, the two chambers defined within the latter are able to be in a vertically superimposed relationship, so as to produce a first air stream which passes through the lower half of the heat exchanger, and a second air stream which passes through the upper half of the heat exchanger. Thus, even if the flow rates of these two air streams are substantially different from each other, this is no longer detrimental because it has no adverse effect on the distribution of the two air streams which flow into the right and left hand sides of the cabin of the vehicle respectively.

In a preferred embodiment of the invention, the shape of the housing is generally that of a parallelepiped, the housing having a rectangular base wall and four side walls joined to the base wall, namely two longitudinal side walls and two transverse side walls, the two inlet sections being defined respectively in the two transverse side wall, and the four said side walls together defining a rectangular open face which constitutes the said outlet section of the housing.

The general direction in which the bulkhead extends preferably corresponds substantially to the direction of a diagonal of a rectangle defined by the general shape of the base wall of the housing.

In addition, it is of particular advantage, and is preferred, to arrange that the two longitudinal side walls are arranged substantially horizontally, being longer than the transverse side walls, which are then of course arranged substantially vertically. For this reason, the general direction in which the bulkhead extends is slightly inclined with respect to the horizontal, and enables the two chambers to be superimposed on each other with the advantages mentioned above.

In one embodiment of the invention, the base wall comprises a central portion which extends in a general direction corresponding to a diagonal of the rectangle, and which is extended by two incurved terminal portions which terminate on two opposed sides of the rectangle, which are preferably the longitudinal side walls of the housing.

In another embodiment of the invention, the bulkhead comprises a single rectilinear portion which extends in a direction close to that of a diagonal of the rectangle and which terminates at two opposed sides of the rectangle corresponding to the transverse side walls of the housing.

Preferably, the separating bulkhead of the housing has two rounded faces which are joined to the base wall of the housing and which are joined together along an edge, these rounded faces being such as to cause the direction of the two air streams to change, so as to direct them towards the outlet section of the housing. In order to facilitate this channeling of the air stream towards the outlet section, the base wall preferably further comprises, in each of the two chambers, at least one deflector or splitter member for changing the direction of flow of the air stream.

The base wall, including the separating bulkhead and the deflector or splitter members if provided, is preferably made so as to be removable from the housing.

The housing preferably constitutes a mounting means in which the heat exchanger can be directly fitted, the latter being an evaporator if the apparatus is for air conditioning. In the latter case, it is of particular advantage if the housing includes a duct for evacuating the condensate formed in the heat exchanger.

The apparatus of the invention may further include a mixing valve for regulating the distribution of air delivered from the outlet section of the housing, between two downstream branches, namely a fresh air transmission branch and an air heating branch. In that case, the mixing valve is preferably mounted for pivoting movement about an axis which is parallel to the inlet direction of the two air streams into the housing.

Various embodiments of the invention will now be described, by way of example only and with reference to the accompanying drawings.

DESCRIPTION OF PREFERRED EMBODIMENTS OF THE INVENTION

Figure 1:
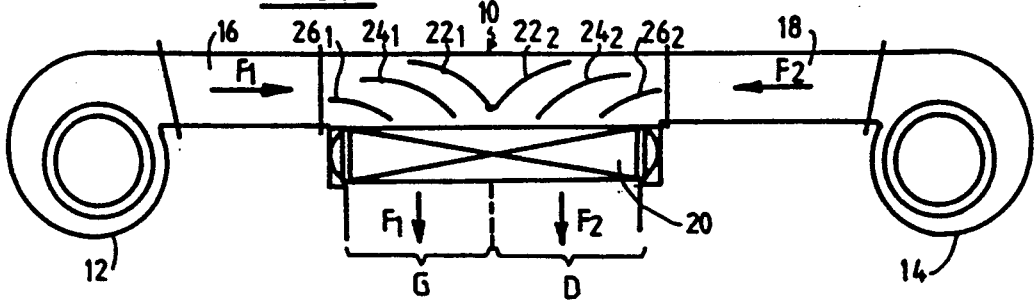
FIG. 1 is a diagrammatic top plan view of a heating and/or air conditioning installation having two air fans, in accordance with the prior art.

Reference is first made to FIG. 1, which shows a heating and/or air conditioning installation of the prior art. This installation comprises a housing 10 and two fans 12 and 14, the latter being situated respectively on the left hand side and the right hand side of a motor vehicle. The installation also includes two ducts 16 and 18, which connect the housing 10 with the fans 12 and 14 respectively. The ducts 16 and 18 are not necessarily of the same configuration. A heat exchanger 20 is mounted in the housing 10, and may for example consist of an evaporator for conditioning the air in the cabin of the motor vehicle.

The fans 12 and 14 are arranged to deliver two streams of fresh air from outside the cabin into the housing 10, which then channels these tow air streams by means of vanes $22_1$, $24_1$ and $26_1$ which are located in the left hand side of the housing, together with further vanes $22_2$, $24_2$ and $26_2$ which are arranged in the right hand side of the housing. These vanes are of generally inwardly curved shape and have generatrices which are parallel to each other and perpendicular to the direction of flow of the air streams F1 and F2 at the respective inlets of the housing 10.

Because of manufacturing tolerances, the fans 12 and 14 may be of substantially different outputs in terms of rate of delivery of air, so that the air streams F1 and F2, which pass respectively through the left hand half and the right hand half of the heat exchanger 20, may have very different flow rates. This effect may be even more enhanced due to the possibility of the ducts 16 and 18 having different configurations. The resulting difference in the flow rates of the air streams, for delivery into the two sides of the cabin of the vehicle, gives rise to a difference in temperature at the outlet of the heat exchanger 20.

Figure 2:
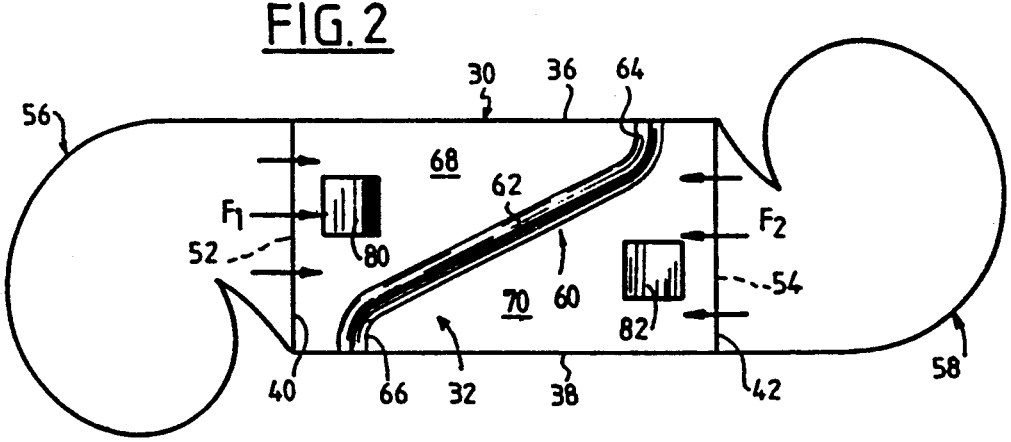
FIG. 2 is an elevation of part of a heating and/or air conditioning installation in accordance with the present invention.
Figure 3:
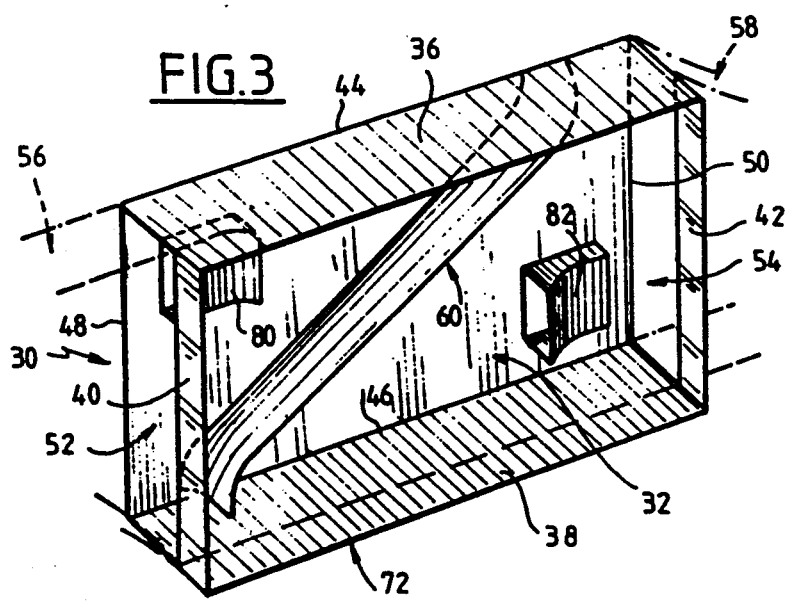
FIG. 3 is a perspective view of the housing in the installation of FIG. 2.

Reference is now made to FIGS. 2 and 3, which show part of a heating and/or air conditioning installation for a motor vehicle, in an improved form. This installation comprises a housing 30, generally in the form of a parallelepiped, and having a rectangular base wall 32 and four side walls which are attached to the base wall. These side walls comprise two longitudinal walls 36 and 38 parallel to each other, and two transverse side walls 40 and 42, also parallel to each other. The longitudinal side walls 36 and 38 are preferably horizontal, while the transverse side walls 40 and 42 are preferably vertical. The walls 36 and 38 are joined to the base wall 32 respectively by edges 44 and 46 which constitute the two large sides of the rectangle. The two smaller sides of the rectangle are represented by edges 48 and 50 which are not joined directly to the walls 40 and 42. These walls define respectively two inlet sections 52 and 54 which lie facing each other, as can be seen from FIG. 3. Each of these inlet sections is rectangular and extends over a height corresponding to that of the edges 48 and 50, with a width which is smaller than the depth of the housing 30. The inlet sections 52 and 54 are adapted to be connected respectively to two fans, indicated diagrammatically at 56 and 58 and mounted respectively on the left hand side and the right hand side of the housing 30. the fans 56 and 58 are arranged to introduce into the housing 30 two air streams in the directions indicated respectively in FIG. 2 at F1 and F2, parallel to each other and in opposite directions, being also parallel to the base wall 32 of the housing 30 as can be seen from FIG. 2.

The base wall 32 carries a separating bulkhead 60 which projects from the wall 32 into the interior of the housing 30, and which extends generally in a direction close to the direction F1, F2 in which the two air streams are introduced into the housing along the base wall 32. In this example, the bulkhead 60 comprises a central portion 62 which extends in a general direction corresponding to a diagonal of the rectangle constituting the base wall 32. The central portion 62 is extended by two incurved terminal sections 64 and 66 of the bulkhead, which terminates at two opposite sides of the rectangle, corresponding respectively to the longitudinal side walls 36 and 38 of the housing. The bulkhead 60 thus defines two distinct chambers 68 and 70 within the housing 30. These chambers are supplied with air respectively by the fans 56 and 58, and extend substantially over the same width in the general inlet directions F1 and F2 of the air streams. The chambers 68 and 70 are open into an outlet section 72 (FIG. 3) of the housing 30. The outlet section 72 is generally rectangular in shape and is defined by an open face of the housing 30, being bounded by the four side walls 36, 38, 40 and 42.

The outlet section 72 is arranged to accommodate a heat exchanger (not shown), which is itself arranged for the streams of external air, delivered respectively by the fans 56 and 58, to pass through it. To this end, the two air streams must undergo a change of direction at right angles to the interior of the housing.

Figure 4:
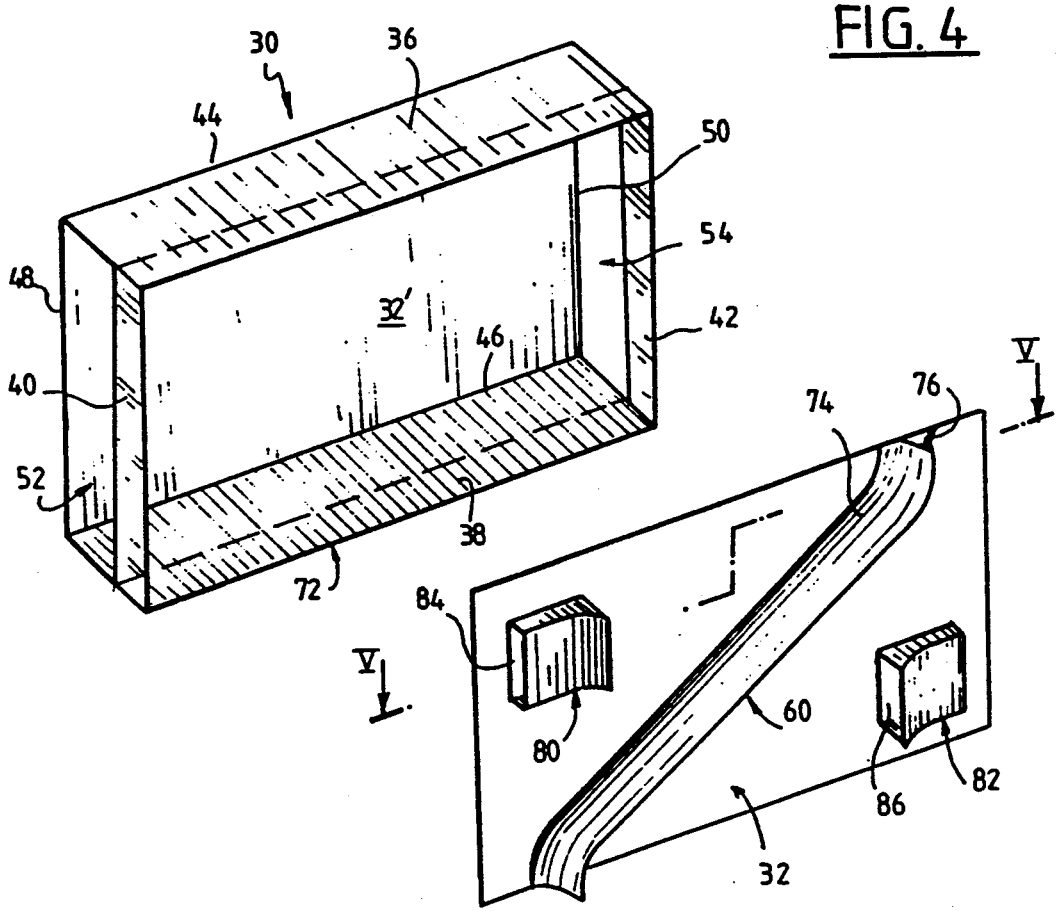
FIG. 4 is an exploded perspective view of the housing shown in FIG. 3.

As shown in FIG. 4, the base wall 32 is preferably removable, and adapted to be applied against a rear wall 32' which in fact constitutes the true base wall of the housing 30.

Figure 5:
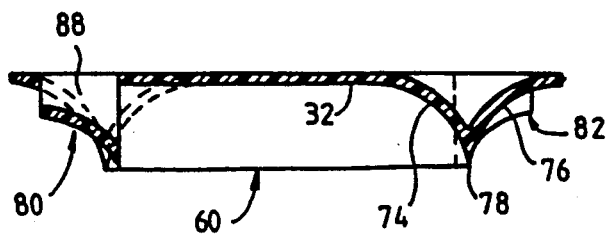
FIG. 5 is a view in cross section of the base wall of the same housing, the section being taken on the line V—V in FIG. 4.

In order to faciltate the change of direction of the air streams F1 and F2 inside the housing 30, the bulkhead 60 has two rounded faces 74 and 76 (as shown in FIG. 5), which are joined to the base wall 32 and which are joined to each other in an edge 78.

In order to assist further in the change of direction of the two air streams, two deflector or splitter members 80 and 82 (FIGS. 2 to 5) are provided in addition. The deflectors 80 and 82 are arranged on either side of the bulkhead 60, in the chambers 68 and 70 respectively. They are of rounded shape, and respectively define passages 84 and 86, the cross section of which changes progressively in such a way as to diverge from the inlet to the outlet. It will be understood that the air stream delivered by the fan 56 flows along the base wall 32 and is diverted by the incurved wall 74, while part of it is diverted by the deflector member 80. Similarly, the air stream delivered by the fan 54 flows along the base wall 32 and is finally diverted by the incurved wall 76 of the bulkhead 60. Part of this stream is, again, diverted, this time by the deflector member 82.

As is shown in FIGS. 4 and 5, the wall 32, as well as the bulkhead 60 and the deflector members 80 and 82, may be formed integrally with each other by moulding in a plastics material. The base wall 32 then has rectangular openings, for example an opening 88 (FIG. 5) in line with the deflector member 80, so as to permit removal of the component form the mould. The presence of these two openings is not detriemental, given that the base wall 32 then lies flat against the wall 32' shown in FIG. 4.

Figure 6:
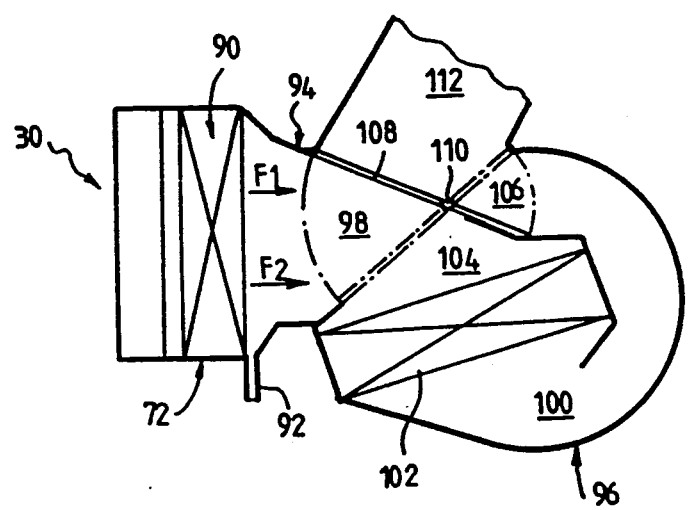
FIG. 6 is a view in longitudinal cross section of part of an installation in accordance with the invention.

Reference in now made to FIG. 6. A heat exchanger 90 is mounted on the outlet section 72 of the housing 30. In this example, the heat exchanger 90 is an evaporator of an air conditioning installation. The housing 30 includes in its lower part a vent 92 for draining condensate formed in the heat exchanger 90.

In this example, the air flow F1 from the fan 56 passes essentially through the upper half of the heat exchanger 90, while the air flow F2 from the fan 58 passes through the lower half of the heat exchanger. Even if these fans 56 and 58 have different delivery air flow characteristics, and even if the air flow rates passing respectively through the upper and lower parts of the heat exchanger 90 are different, this is not detrimental because the two air streams are superimposed on each other. There is therefore no disparity between the right and left hand halves of the heat exchanger.

In the installation shown in FIG. 6, the outlet section 72 of the housing 30 is joined to an inlet section 94 of another housing 96, the structure of which is conventional. The housing 96 defines within it a fresh air transmission branch 98 and an air heating branch 100. The latter is of U-shaped configuration, and contains a further heat exchanger 102 which consists of a heating radiator. The branch 100 comprises an inlet section 104 and an outlet section 106, which are open respectively upstream and downstream of the branch 98.

A mixing valve 108, which is mounted pivotally about an axis 100, enables the air which enters the housing 96 to be distributed between the branches 98 and 100. In consequence, the temperature of the air leaving the housing 98 is also regulated. In the position of the valve 108 shown in full lines in FIG. 6, the superimposed or whole air stream passes through the branch 100 and is thus heated.

In another extreme position, shown in phantom lines, the air escapes only via the branch 98 without being heated. The mixing valve 108 can of course be set in any intermediate position. The cold or heated air is delivered into a mixing zone 112, from which it is passed in known manner to various air distribution vents in the cabin of the vehicle. In the example, the axis 110 of the mixing valve 108 is horizontal, and is therefore parallel to the direction in which the two streams F1 and F2 are introduced through the inlet sections of the housing. In consequence, if the flow rates of the air streams passing respectively through the upper half and the lower half of the heat exchanger 90 are different, this difference is not detrimental since it can be compensated for by adjustment of the mixing valve 108.

Figure 7:
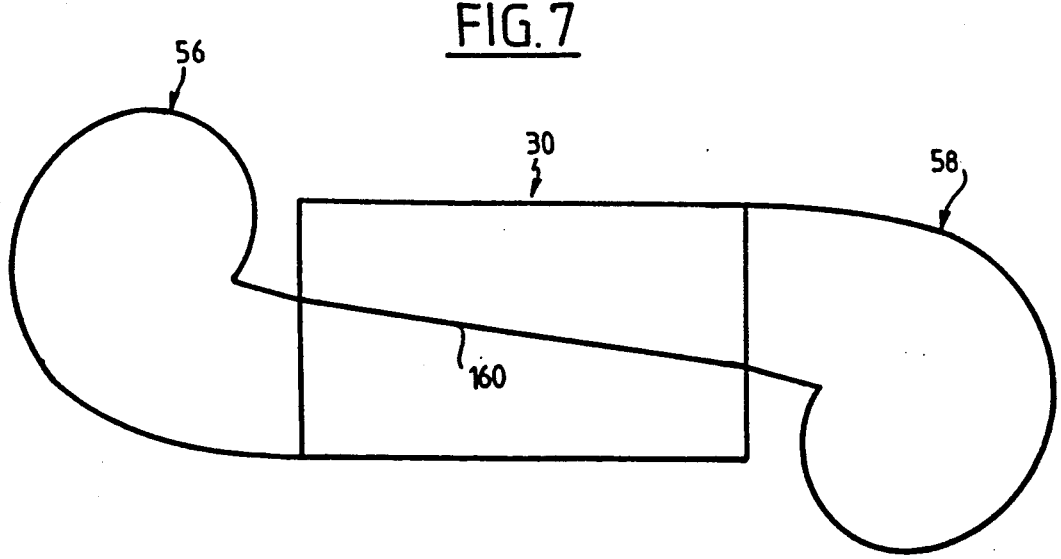
FIG. 7 is an elevation of part of an installation in another embodiment of the invention.

Finally, reference is made to FIG. 7, which shows another embodiment, in which the bulkhead, 160, comprises a single straight portion, which extends in a direction close to that of a diagonal of the rectangle and terminates at two opposed sides of the rectangle, which in this case correspond to the transverse walls 40 and 42.

What is claimed is:

1. Heating and air conditioning apparatus for a motor vehicle, comprising a housing having two opposed air inlet sections disposed facing each other and an outlet section, a heat exchanger associated with the outlet section of the housing, two fans for delivering fresh air to the housing, means connecting each fan with a respective one of said inlet sections to deliver air streams into the interior of the housing, each inlet section defining respective parallel and opposed inlet directions for said air streams, the housing comprising a base wall which generally defines a rectangle and a separating bulkhead carried close to the base wall and projecting from the base wall into the interior of the housing toward said outlet section, the bulkhead extending in a direction which is substantially a diagonal of said rectangle and separating the housing into two superimposed chambers extending substantially over the same width in the inlet direction, said chambers opening into the outlet section which receives both air streams, said outlet section receiving superimposed streams and directing them towards the heat exchanger.

2. Apparatus according to claim 1, wherein the housing has the general shape of a parallelepiped, its said base wall being rectangular and the housing further comprising four side walls attached to the base wall, the side walls comprising two longitudinal side walls and two transverse side walls, each transverse side wall defining a respective said inlet section, and the four side walls together defining a rectangular open face constituting the said outlet section.

3. Apparatus according to claim 2, wherein the housing has two longitudinal side walls defining two opposed sides of a rectangle, and the separating bulkhead comprises a central portion, and two curved terminal portions terminating on the said two opposed sides of the rectangle.

4. Apparatus according to claim 2, wherein the housing has two transverse walls defining two opposed sides of a rectangle, and the separating bulkhead is in the form of a single straight portion extending in a direction close to that of a diagonal of the rectangle and terminating on the two opposed sides of the rectangle.

5. Apparatus according to claim 1, wherein the bulkhead has two rounded faces joined to the base wall and joined together in an edge, to aid in changing the direction of the superimposed air streams.

6. Apparatus according to claim 1, wherein the base wall further has at least one splitter member in the region of each chamber, for changing the direction of flow of the corresponding air stream.

7. Apparatus according to claim 1, wherein the base wall is formed as a separate element which is removable.

8. Apparatus according to claim 1, wherein the housing further includes means for directly receiving the heat exchanger, the heat exchanger being an evaporator and the housing further comprising a duct for evacuating condensate from the evaporator.

9. Apparatus according to claim 1 or claim 2, wherein the outlet section of the housing is joined to the inlet section of another housing, said another housing comprising a fresh air transmission branch, an air heating branch, means connecting the outlet section with the air transmission branch and the air heating branch, a mixing valve for regulating the distribution of air delivered from the outlet section between the branches, and a pivot axis of the mixing valve being in a direction which is parallel to the direction of each of the two air streams entering the opposed inlet sections of the housing.

* * * * *